United States Patent [19]

Chaney

[11] Patent Number: 5,473,609
[45] Date of Patent: Dec. 5, 1995

[54] METHOD AND APPARATUS FOR PROCESSING A CONDITIONAL ACCESS PROGRAM GUIDE AS FOR A SATELLITE TV SERVICE

[75] Inventor: John W. Chaney, Indianapolis, Ind.

[73] Assignee: Thomson Consumer Electronics, Inc., Indianapolis, Ind.

[21] Appl. No.: 249,919

[22] Filed: May 26, 1994

[51] Int. Cl.⁶ ........................................ H04J 3/24
[52] U.S. Cl. ............... 370/94.1; 370/73; 370/77; 348/460; 348/906
[58] Field of Search .................. 370/94.1, 110.1, 370/71, 73, 76, 77; 348/460, 906; 455/45, 66

[56] References Cited

U.S. PATENT DOCUMENTS

| | | | |
|---|---|---|---|
| 4,931,871 | 6/1990 | Kramer | 348/460 |
| 5,038,211 | 8/1991 | Hallenbeck | 348/460 |
| 5,200,822 | 4/1993 | Broufin et al. | 348/460 |
| 5,239,540 | 8/1993 | Rovira et al. | 370/77 |
| 5,311,423 | 5/1994 | Clark | 348/906 |
| 5,359,601 | 10/1994 | Wasilewski et al. | 370/73 |

OTHER PUBLICATIONS

Caitlin Bestler, Zenith Cable Products, *Flexible Data Structures and Interface Rituals For Rapid Development of OSD Applications*, 1993 NCTA Technical Papers, 42nd Annual Convention & Exposition of the NCTA, San Francisco, Calif., Jun. 6, 1993, pp. 223–236.

Jeffrey Cox and Gojo Strkic, Philips Broadband Networks, Inc., *Extended Services in a Digital Compression System*, 1993 NCTA Technical Papers, 42nd Annual Convention & Exposition of the NCTA, San Francisco, Calif., Jun. 6, 1993, pp. 185–191.

Mack Daily, Zenith Electronics Corp., *Addressable Decoder with Downloadable Operation*, 1993 NCTA Technical Papers, 42nd Annual Convention & Exposition of the NCTA, San Francisco, Calif., Jun. 6, 1993, pp. 82–89.

*Primary Examiner*—Douglas W. Olms
*Assistant Examiner*—Shick Hom
*Attorney, Agent, or Firm*—Joseph S. Tripoli; Eric P. Herrmann; Ronald H. Kurdyla

[57] ABSTRACT

In an audio/video transmission system, a method of forming program guide information conducive to selective display at respective receivers includes arranging program guide information in different data blocks according to types of guide information. One such data block contains channel information (CSSM$_i$) describing the respective channels. Respective CSSM$_i$ in this block include a channel information customer service system byte (CI_CSS) which contains conditional access information related to a channel associated with a CSSM$_i$. In a receiver embodiment, a subscriber specific byte (CA_CSS) is stored and accessible to program guide processing apparatus. Prior to displaying received program guide information for a particular channel, the subscriber byte CA_CSS is compared with the channel information byte CI_CSS in the program guide. Dependent upon the results of the comparison, the guide data for that particular channel is either displayed or not displayed in the program guide.

11 Claims, 4 Drawing Sheets

METHOD AND APPARATUS FOR PROCESSING A CONDITIONAL ACCESS PROGRAM GUIDE AS FOR A SATELLITE TV SERVICE

This invention relates to the formation, transmission and processing of a television program guide as for a broadcast television service.

BACKGROUND OF THE INVENTION

A direct broadcast satellite system has been proposed which will transmit compressed television and other ancillary signals in compressed and packeted form. The system has a potential of transmitting hundreds of programs. Each program may include a number of services. A service is defined herein as a program component, such as a video signal, or an audio signal, or a closed caption signal, or data, etc. The data may include executable computer files or programs for use by appropriate receivers. Each service of each program is identified by a unique service identifier (SCID). Thus if a program includes four service components, the program will be assigned four SCIDs. The information for respective services will be transmitted in packets of predetermined amounts of data (for example 130 bytes) and each packet of information will include a SCID identifier corresponding to the service.

A plurality of programs, for example six to eight, may be transmitted in time division multiplexed form (on a packet basis) on a single carrier frequency. To provide, e.g. 160 programs, the system will transmit on 20 to 28 carriers.

In order to receive a particular program, a receiver must be tuned to a particular carrier, and programmed to select or demultiplex signal packets associated with the desired program. Information associating the service components (SCIDs) with a particular program are contained in a program guide, which is itself a program that is transmitted. Because of the large number of programs and the consequential larger number of services, the programming information associating programs with services is ever changing, and must be continually updated.

The program guide includes information used by respective receivers to associate transmitted time division multiplexed service packets with programs desired to be viewed. The program guide is a program which is assigned a particular SCID that a receiver will automatically select on start up to load the program guide data in memory. The receiver will include a microprocessor, which is responsive to programming commands, to scan the stored program guide and determine the carrier on which a desired program is transmitted and the SCIDs associated with the desired program's service components. Thereafter the receiver tuner will be tuned to the appropriate carrier frequency and packet selection apparatus will route the selected service component packets to corresponding signal processing apparatus.

The program guide information that has been discussed thus far is only machine usable, that is, the SCID information is useful to a receiver apparatus but not of interest to the user. Information of interest to the respective user is the schedule of programs, the times of broadcast, the cost of pay per view programs, what movies or sporting events will be shown, etc. All of this data may also be included in the program guide and arranged in a form conducive to display and perusal. The display and perusal may be performed by conventional menu programming using the receiver On Screen Display apparatus.

Program guide information is segmented into a master guide which is transmitted on substantially all carriers and special guides which are transmitted on only one carrier. The master guide includes limited program information related to the next several viewing hours. The special guides may include comprehensive programming information for an extended period such as a month.

Various program providers may rent space on the broadcast system. Access to program material provided by the various providers may be by subscription. For user convenience, and also to conserve system bandwidth, it is desirable to include programming information for all providers in one program guide. On the other hand, it may be bothersome, for users not subscribing to particular program providers or to particular services available from respective providers, to have to wade through program guide information for which the user has not subscribed. Therefore, a subscriber specific mechanism for precluding display of particular program guide information is desirable.

SUMMARY OF THE INVENTION

The present invention includes a method of forming program guide information conducive to selective display at respective receivers. Program guide information is arranged in different data blocks according to types of guide information. One such data block contains channel information ($CSSM_i$) describing the respective channels. Respective $CSSM_i$ in this block include a channel information customer service system byte (CI_CSS) which contains conditional access information related to a channel associated with a $CSSM_i$.

In a receiver embodiment, a subscriber specific byte (CA_CSS) is stored and accessible to program guide processing apparatus. Prior to displaying received program guide information for a particular channel, the subscriber byte CA_CSS is compared with the channel information byte CI_CSS in the program guide. Dependent upon the results of the comparison, the guide data for that particular channel is either displayed or not displayed in the program guide.

BRIEF DESCRIPTION OF THE DRAWINGS

The invention will be described with reference to the attached FIGURES wherein.

DETAILED DESCRIPTION

The present invention will be described in the environment of a direct broadcast satellite system, DBS; however, it will readily be appreciated that its use is not limited to this environment. The invention is at least applicable, in general, to a broad range of time division multiplexed television broadcast systems such as packet cable and high definition television systems for example.

Figure 1:
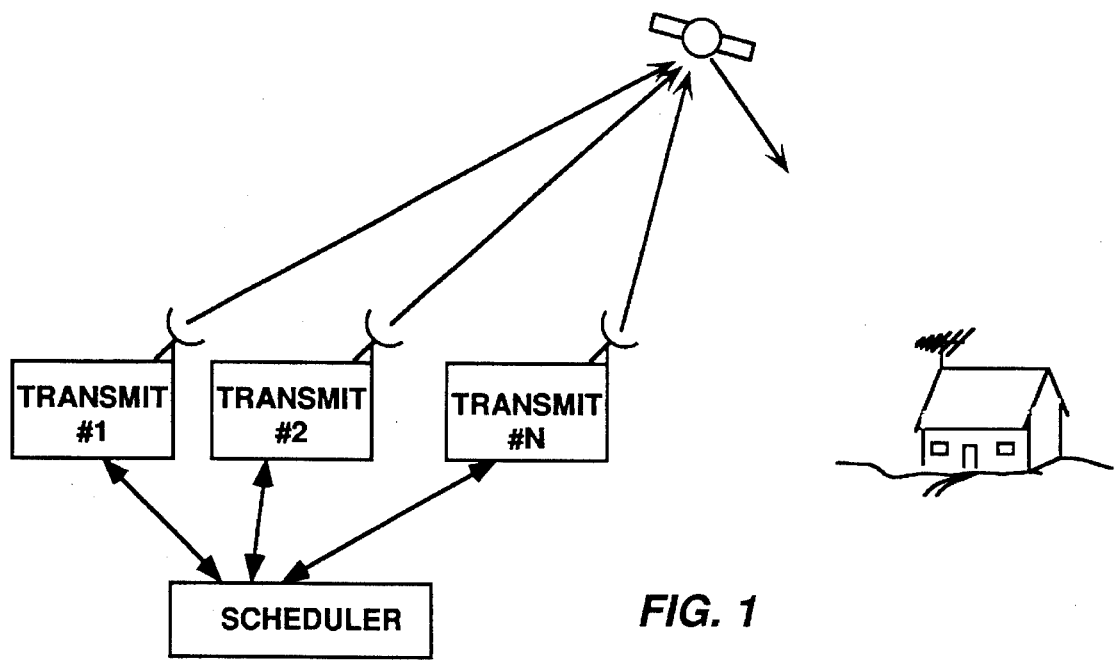
FIG. 1 is a pictorial diagram of a satellite transmission system.

Referring to FIG. 1, a DBS system includes a satellite containing a number of transponders. Respective transponders relay information between an earth bound transmitter and an earth bound receiver (e.g. in a home). Each transponder responds to signal transmitted on an exclusive carrier frequency.

The system may include a plurality of transmitters, (transmitters #1 to N) one for each transponder. The transmitters respectively transmit different program material such that the combination of transmitters provide a wide variety of television viewing material. The system includes a scheduler to coordinate program material amongst the respective transmitters.

Figure 2:
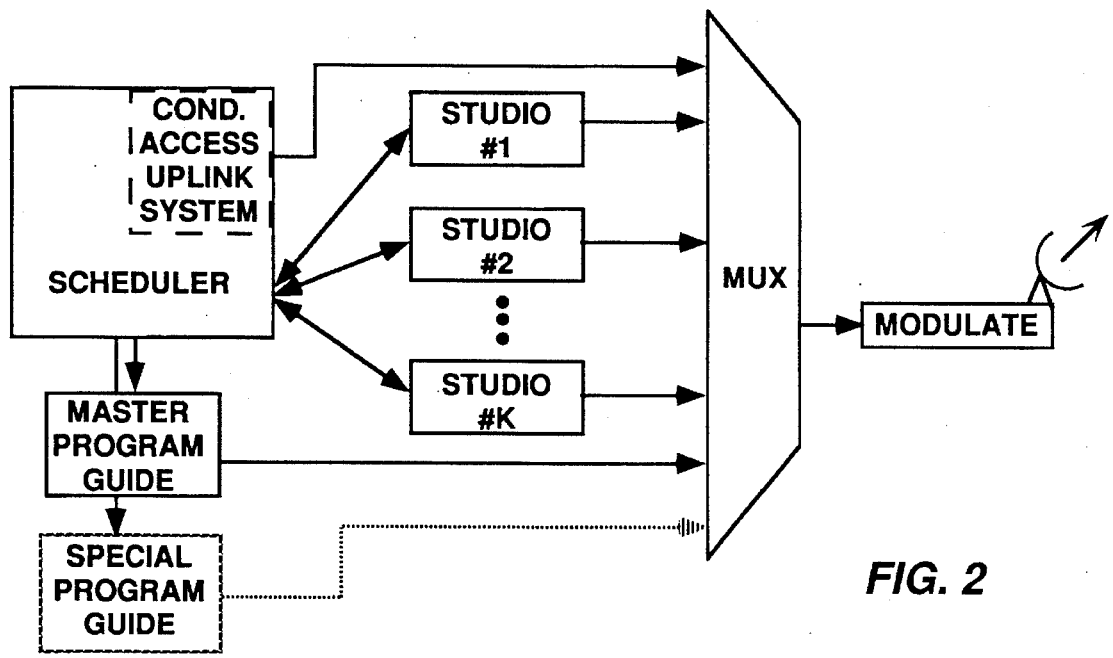
FIG. 2 is a block diagram of one of the transmission elements illustrated in FIG. 1.

FIG. 2 illustrates an exemplary transmitter of FIG. 1. In the present exemplary system, each transmitter is in actuality a plurality of program generating organizations and/or equipment. These organizations/equipment are illustrated as studios, (STUDIOS 1 to K) each of which is capable of providing a packet audio/video/data (AVD) program. (U.S. Pat. No. 5,168,356 by Acampora et al. describes apparatus for generating packet audio/video programs.) The respective audio or video or data component of each program is a packet signal identified with an exclusive service channel identifier, SCID. Packets of the respective component packet signals are time division multiplexed in a program multiplexer (not shown) to form the respective AVD signal provided by one of the studios. The packet programs provided by the studios are time division multiplexed in a channel multiplexer (MUX). The output of the channel multiplexer is then modulated on an assigned transponder carrier frequency. The program multiplexing apparatus and/or the modulator may include forward error correction, FEC, apparatus for generating error parity bytes and for interleaving portions of the signal to effect a degree of error immunity during the transmission process.

The scheduler of FIG. 2, which corresponds to the scheduler of FIG. 1, is an information management system including human intervention. The scheduler may include the system business office. Each of the transmitters may include a subscheduler which is responsive to the scheduler and communicates therewith. The scheduler assigns channel space and SCIDs to the subschedulers which in turn assign SCIDs to program components and generate corresponding program guide information. This program guide information is communicated to the scheduler for formation of the actual program guide. The scheduler may also assign SCIDs to program components on particular transmitters, and generates a packet program guide for transmission. The scheduler maintains a running data base of all system programming for an extended period of time. The SCIDs of respective programs are associated with program names. In addition, the respective program names are associated with reception times and may be tagged with "type" codes for search purposes. For example, movies may be tagged with a movie code, sports programs with a sports code, soap operas with a soap code, horse operas with another code, etc. In addition, the respective program types may be categorized into subsets of the primary types such as movies being classified as thrillers, horror, comedies, etc., and the sports category classified into professional and amateur, for example.

An example of the types of information that may be maintained in respective records of the scheduler data base is shown in TABLE I. The exemplary record shown is for the 2-hour movie, Bambi, to be aired 27 Apr. 1994 at 7:30 PM. The database may also include common system messages to be transmitted to current subscribers.

TABLE I

| No. | ITEM | DESCRIPTION |
|---|---|---|
| 1 | year | 1994 |
| 2 | month | 04 |
| 3 | date | 27 Wed. |
| 4 | times | start 7:30P; end 9:30P |
| 5 | channel | SHO |
| 6 | PPV | yes/no |
| 7 | closed cap. | yes/no |
| 8 | provider | studio xyz |
| 9 | SCIDs | video-xxx..xx; audio-xxx..xx; data-xxx..xx; etc. |
| 10 | prog. name | BAMBI |
| 11 | description | Disney movie released year ... etc. |
| 12 | class | (audio/video/data) |
| 13 | subclass 1 | movie |
| 14 | subclass 2 | (rating) |
| 15 | subclass 3 | (children/western/SciFi/romance/nature/.etc.) |
| 16 | billing info | ??? |

The scheduler scans the data base periodically and generates a master program guide. This master program guide is an arrangement of a simplified portion of the programming information relevant to programs which will be transmitted within the subsequent few hours. Items from the data base which may be included in the master guide are items 4 through 15 for the current day spanning a period of several hours and including all programs in progress. The arrangement is in a data file format which comports with receiver microprocessor (μPC) programming to condition the data for display as a menu programming guide, and to identify service component packets of programs selected for viewing.

Even though the data will, in part, be displayed on the television screen, it is not in compressed video format, because text is not particularly conducive to MPEG compression, and text in MPEG compressed form is not conducive to μPC manipulation. The master program guide is a data file which is packeted in a similar manner as the other program service components and assigned a specific predetermined SCID such as 000000000001.

Figure 3:
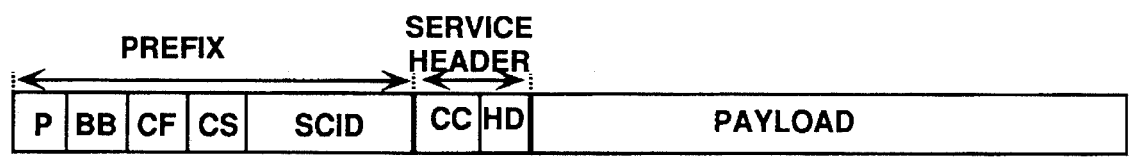
FIG. 3 is a pictorial diagram describing the general format of signal packets in which program component service data is transmitted.

FIG. 3 illustrates an exemplary packet format. Each packet includes a prefix which is of the same form for all service types. The exemplary prefix includes a one bit priority field P; a one bit boundary field B B, which indicates boundaries between significant signal changes; a one bit field, CF, which indicates if the payload is scrambled; a one bit field, CS, which indicates the one of two scramble keys that is to be used to unscramble a payload; and a twelve bit SCID. Following the prefix is a service header which is service specific. The service header includes a four bit continuity count value CC. The continuity count is service specific, with the count value in successive packets being successively incremented by one unit, modulo 16. For a video service the count values are followed by a four bit field, HD which indicate certain payload options. The remainder of the packet is the signal payload. The packet may include error code parity bits appended to the end of the payload. Such error coding may be performed over the entire packet, or only over portions thereof.

The master program guide is sent in packet form to each of the transmitters wherein it is time division multiplexed with the respective program packets by the channel multiplexer if there is sufficient bandwidth. In scheduling the respective transponders, the scheduler attempts to reserve space for the program guide on each transponder, so that substantially every system transponder conveys the master program guide regularly. Since the master program guide is transmitted on substantially all transponders, no matter to which transponder a receiver is tuned, the user can immediately switch to the master program guide to review available programming.

The master program guide is repeatedly sent and is updated regularly, for example every 30 minutes. The repetition rate is relatively frequent, the goal being that a subscriber turning on his receiver can access a programming menu substantially immediately. This is possible because the amount of data contained in the master guide is relatively limited.

A much more comprehensive program guide, termed a special guide, is also formed by the scheduler, and includes all programming information for a period of the following thirty days, for example. This is a significant amount of data, but the system inventor decided it would benefit subscribers to be able to schedule their viewing over longer periods (weeks or a month). The special program guide is a packet data program that is applied to only one of the transmitters and thus is available on only one of the transponders, albeit that the particular transponder may change day to day or hour to hour in accordance with transmitter bandwidth availability and other scheduling requirements. The SCID of the special guide is variable and is assigned by the scheduler. The location of the special guide is listed in the master guide along with other programming.

In a preferred embodiment, the master guide is formed as four sequential blocks of data designated;

SEGM: APGD: CSSM1 . . . CSSMnseg: PISM1 . . . PISMnseg. The special guide on the other hand is partitioned into a plurality of segments or portions (from 1 to 16) with an index "nseg" indicating the current number of segments comprising the special guide. Each segment carries program information for one or more channels, which range from 100 to 999 and each special guide segment includes two sequential blocks of data;

CSSM1 . . . CSSMnseg: PISM1 . . . PISMnseg.

The SEGM block contained in the master guide includes information about the partitioning of the channel space into segments and the number of segments. The block APGD contains a program guide map which indicates which special guide segments are active and their location ( i.e., the particular transponder carrying the segment) as well as the SCIDs of respective segments. The APGD contains program information relating to ratings and theme, such as items 10-15 in the above data base record. In addition, the APGD includes a program guide map associating special guide segments with respective names, numbers and types. The program guide map associates a PG_CSS byte or code with each guide. This code is used to permit/preclude display of respective program guide segments.

The master guide and every special guide contain a CSSM block and a PISM block. The CSSM block is a channel to service_id segment map. This includes data describing channels (channel name, call letters, channel number, type, . . . ) which are in the corresponding segment. The PISM block contains linked lists of program information (title, start time, duration, rating, category, . . . ) that are on each channel described in the corresponding CSSM.

The program guide information may be apportioned amongst the different ones of the plurality of special guides in varying formats. That is, respective special program guides may include information from only one of a plurality of program providers. Alternatively, information carried on different blocks of channels may be divided amongst the plurality of special program guides. For example, program guide information for channels 100 to 300 may be allocated to special guide 1; channels 301 to 500 to special guide 2; channels 501 to 700 to special guide 3; etc. In both of these special guide formats, each special guide may include program guide viewing information for that number of days the special guide has capacity to hold. Another alternative arrangement is the division of viewing times. For example, the master guide may include program guide information for the next two hour interval; special guide 1 may include program guide information for the following next 8 hours; special guide 2 may include program guide information for the following next 8 hours; special guide 3 may include program guide information for the following next 8 hours; etc.

Included in every $CSSM_i$ record is a CI_CSS byte or code. The CI_CSS byte is used to permit/preclude display of respective channel/program information in the master or special program guides. CI_CSS and PG_CSS bytes may be program provider specific or arbitrarily assigned on a channel basis by the system manager. The PG_CSS of a special program guide which is specific to a particular provider may be assigned a provider specific code. This provider specific code may be utilized by respective receivers to preclude display of this special guide to non subscribers. CI_CSS bytes associated with channel/program information provided in program guides may also be provided provider specific codes such that display of channel information which is contained in non provider specific program guides may be precluded. (Note that the master guide may be non provider specific.) It will be appreciated that a provider may be assigned more than one code to allow for selective display of program guide information between different classes of subscribers or non subscribers. In addition, the system manager may assign a universal _CSS codeword to permit unconditional display of program guide information. Assume that the CI_CSS and PG_CSS bytes are eight bits. The system manager may assign the byte 00000000 to connote unconditional access. Any guide or channel assigned a CI_CSS and PG_CSS byte of 00000000 will be available to be viewed by all system users, whether or not they are subscribers.

Program guide information may be divided into conditional access classes for viewer access. In the simplest arrangement all program guide data may be arranged in eight conditional access, CA, classes, one for each bit of the eight bit CI_CSS and PG_CSS byte. These CA classes may be assigned on a program provider basis or according to some other criteria.

The eight bits of the CI_CSS or PG_CSS byte represent 256 different states, and thus can accommodate a much larger number of CA classifications. Nominally a broadcast system will have a relatively limited number of program providers. Assuming that the number of providers is sixteen or less, the number of possible states may be allocated thusly. The four more significant bits of the CI_CSS and PG_CSS byte may identify respective program providers, and the four least significant bits may be assigned values at the discretion of the respective provider. In this instance each of the sixteen or less providers may allocate his program guide information into sixteen different CA display classes.

Conditional access to special guides and/or channel information is effected at the receiver by comparing the respective CI_CSS and PG_CSS bytes in the program guides with a user CA_CSS byte which defines in part the viewing entitlements of the respective user. The CA_CSS byte is generated by a conditional access uplink system and transmitted to the respective user. The conditional access uplink system, which is an element of the scheduler, generates a user specific conditional access packet when services are purchased or updated by the user. For example, when a subscriber telephones a program provider to request addition or deletion of premium channels to his subscription, the conditional access uplink system is directed by the system manager to create a new CA_CSS byte or bytes for that subscriber reflecting these changes. This new CA_CSS byte is included in a data packet which is directed specifically to his receiver, and a conditional access smart card system therein. The user is directed to tune to a particular channel for a particular time interval and the packet is applied to that channel by the scheduler at some time during the interval as system bandwidth permits.

The time span of the programming data included in the master guide is determined by the amount of memory available for processing the guide in the receiver. The exemplary system described allows for a master guide of 242 packets of 127 bytes each of data. Current data for all channels is included in the master guide, and as much future programming data as will fit within the 30K bytes of master guide space. This results in approximately two hours of program viewing data.

Special guides are not limited by memory constraints, but rather by bandwidth. To minimize bandwidth demands upon the system by the special guide, the special guide segments are arbitrarily limited to 750 packets of 127 bytes, or approximately 95K bytes per segment and a total of 1.5M bytes for all 16 segments.

Each special guide segment is assigned a different SCID, and different ones of the segments may be transmitted on different transponders so that special guide data is substantially evenly distributed amongst all of the transponders.

Figure 4:
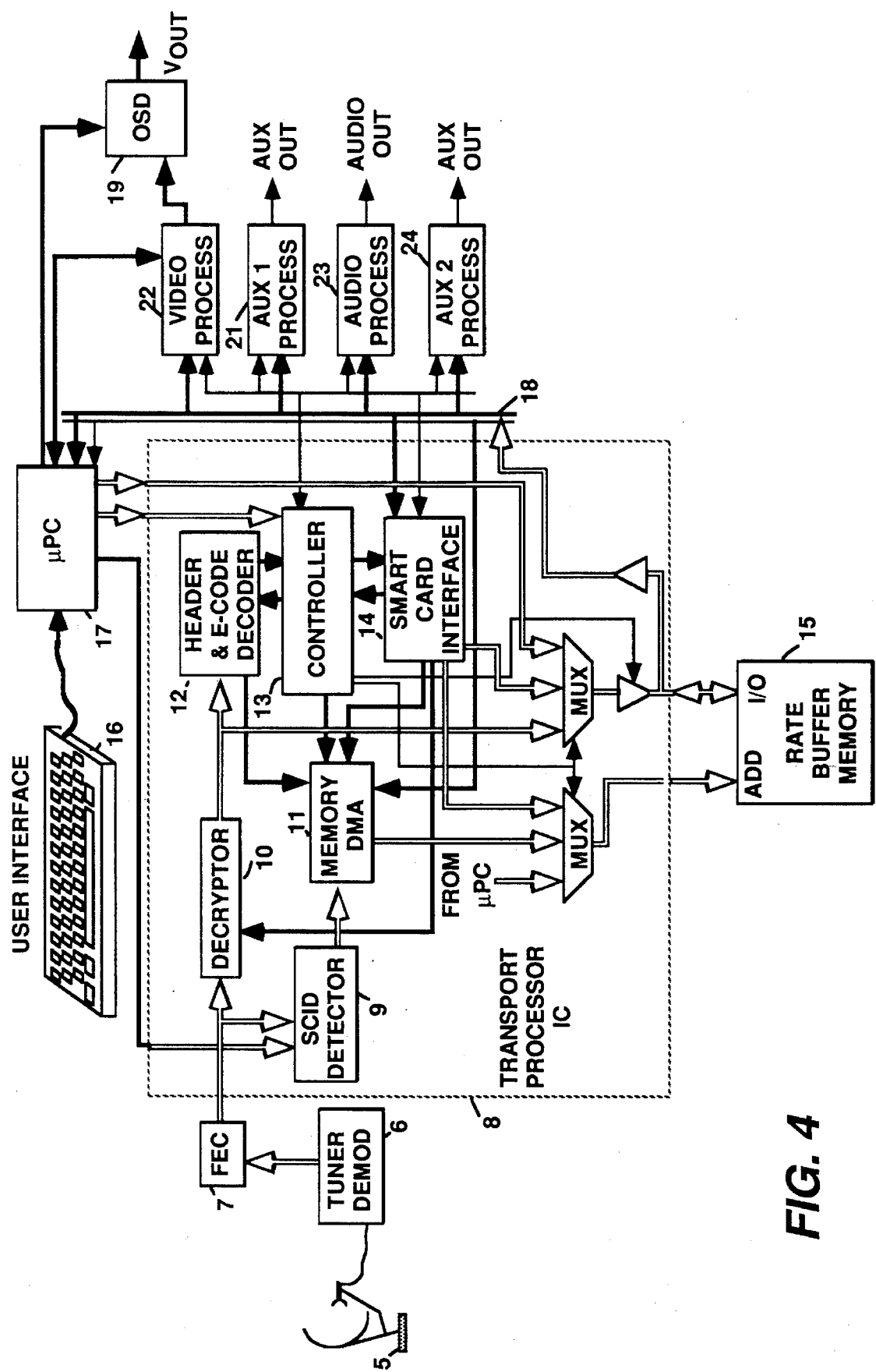
FIG. 4 is a block diagram of a portion of a receiver apparatus embodying the present invention.

FIG. 4 illustrates in block form, a portion of an exemplary AVD receiver. Transmitted AVD signal is captured by an antenna 5 and coupled to a tuner-demodulator 6. The tuner is controlled by the µPC to select a desired transponder carrier frequency. The selected carrier is demodulated and the modulating signal is output from the tuner-demodulator 6 in binary form. The modulating signal is applied to a forward error correcting circuit, FEC, 7, which corrects correctable errors and generates an error signal for respective signal packets which contain non-correctable errors. The FEC provides a time division multiplexed packet signal including a plurality of programs one of which is the master program guide.

The packet stream from the FEC is applied to a transport processor 8. The transport processor includes circuit elements for selecting ones of packets from the multiplexed packet stream, decrypting (descrambling) appropriate packets, and separating the service payloads from selected packets. In the transport processor, the packet stream from the FEC is applied to a decryptor 10 and to an SCID detector 9. At system start up and at regularly spaced intervals, the system controller or µPC 17 is programmed to condition the SCID detector to detect occurrences of packets containing the master guide SCID. On detection of master guide packets, the SCID detector 9, conditions the memory DMA circuitry 11 to store the master guide packet payloads in a predetermined block of a rate buffer memory 15. The µPC, responsive to user commands input via a user interface 16, scans this block of memory for program data to determine the SCIDs associated with program components of the program which the user wishes to view. These SCIDs are applied to the SCID detector 9 to condition it to select the desired program service components. The memory DMA 11, in cooperation with the transport controller 13 and the µPC assigns respective blocks of the rate buffer memory 15 to respective service components associated with the selected SCIDs. As packets which contain the selected SCIDs are detected, the DMA 11, loads their payloads in the corresponding memory blocks. As respective service component processors 21–24 need data, they request it of DMA 11 through the transport controller 13. Controller 13 arbitrates memory access contention between read and write demands of the various elements according to a predetermined priority to satisfy all elements. Blocks of the memory 15 that are assigned for storage of particular service components, such as video and audio, are in effect conditioned to operate as first-in-first out memories (FIFOS), each with a storage capacity of several packet payloads.

In this example, the transport processor includes a header and error code decoder 12 which is a dual purpose matched filter. In one mode it determines which of packets of entitlement data a particular subscriber is entitled to accept. In a second mode, the decoder 12, is programmed to search for particular start codes in payloads of video service data, for example. Detection of the desired parameters in either mode condition the memory addressing circuitry to either reset or not reset particular memory address pointers. The transport processor also includes a smart card interface. The smart card interface interfaces a smart card with the receiver system. The smart card contains a entitlement data and processor which controls access to particular programs, maintains billing information, and in conjunction with a modem communicates with service providers. The smart card utilizes the entitlement data mentioned above.

The decoder 12, directs user specific packet payloads containing entitlement data to the smart card. This includes the conditional access packet generated by the conditional access uplink system which contains the user specific CA_CSS byte or bytes. The CA_CSS byte or bytes is stored by the smart card apparatus for future use. The CA_CSS data may be derived from transmitted conditional access packets, but it may also may be resident in the smart card when purchased by the subscriber.

The rate buffer memory 15, is multiplexed between operating as a compressed video rate buffer, a compressed audio rate buffer, master guide storage, smart card memory, µPC working memory and µPC storage. This is only possible because the program guide is split between the master and special guides. The master guide data is relatively small and hence consumes little memory space. The entirety of the memory 15 is not large enough to contain the special guide.

The master guide, once received is retained in the rate buffer memory, albeit it is periodically updated. Master guide retention allows instantaneous channel changes because the associated SCIDs are always available. If the master guide were dropped after each channel selection, a delay would be incurred between channel selections while the master guide was reloaded.

During intervals that the special guide is to be processed, scanned, and/or manipulated, no other services will be processed, hence the entire buffer memory 15 is available for processing the special guide. Since the memory is not large enough to contain the entire special guide at one time, processing of parts of the special guide would either have to be done iteratively or else the memory would have to be expanded. The former would entail too long a process to be favorably accepted by consumers and the latter would undesirably increase the cost of the apparatus.

Video decompression requires a relatively large dedicated memory. The memory requirements for decompression of MPEG coded signal are one frame of video display memory, two frames of storage for predicting bidirectionally coded or B frames, and further working storage for reformatting data applied to the decompressor. For decompressing 4×3 aspect ratio NTSC resolution images the required memory is about 16Mbits. In FIG. 4 this memory is subsumed within the video processor 22, is large enough to accommodate the special guide, and is not otherwise used when the special guide is processed.

During intervals when it is desired to use the special guide, the SCID detector is conditioned to select special guide packets and store their payloads in the buffer memory 15 as though it were compressed video data. The video processor is conditioned by the µPC to request data from the buffer memory block allotted the special guide SCID. This data is written to the video processor memory as if it were compressed video data. In this mode, the video channel is given priority, thus the special guide data is stored as fast as it arrives and may be loaded relatively rapidly.

When the special guide is transmitted as segments multiplexed amongst all channels, the microprocessor 17 must access the master guide in the buffer memory 15 and scan the segment map and APGD data block to determine channels and SCIDs of the respective segments. The microprocessor 17 is programmed to tune to the requisite channels containing the desired special guide segments and to condition the SCID detector to select the corresponding packets. Preferably all segments on a channel will be extracted before tuning another channel. It is also preferred that the respective channels be tuned in ascending or descending order to minimize resynchronization time between channels.

A µPC interface is incorporated in the video processor 22 to permit reading data from the video processor memory by the µPC. The µPC contains programs (e.g. search routines with information filters of known type) to permit the viewer to conveniently manipulate the special guide data. Since all of the special guide data is concurrently available, manipulation of the data may be accomplished as fast as the viewer can change commands.

The manipulation of the special guide requires display of portions of the guide. The special guide data is transmitted in a data format not as compressed or non-compressed video signal. To display special guide information, the µPC selects the information for display and applies this data to an on screen display device (OSD) 19. When the program guide is being manipulated the OSD will monopolize the entire screen for the display of special guide text or other data and/or program command structure. At other times, when video is being decompressed, the OSD operates in conventional fashion to overlay desired text material on video images.

Figure 5:
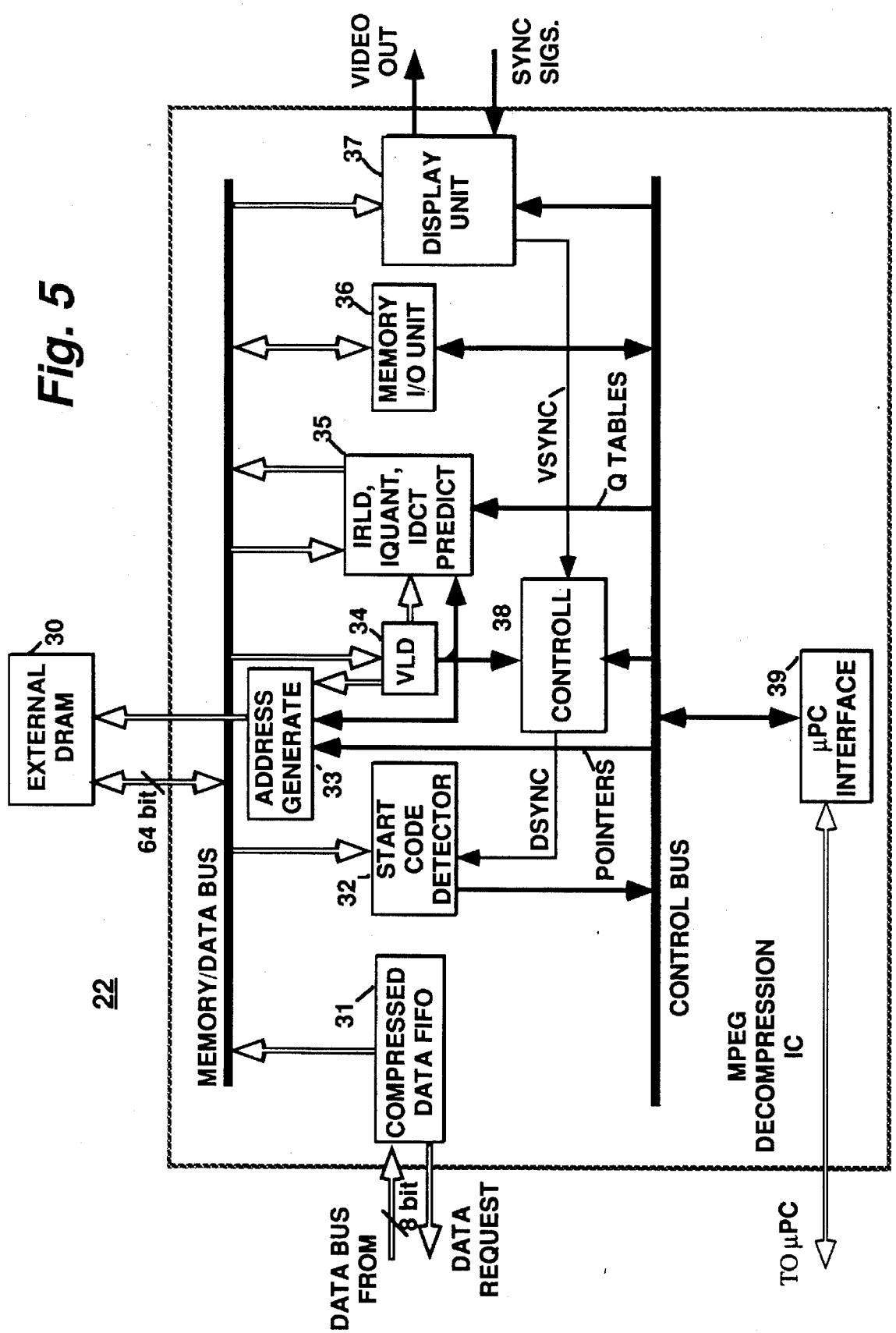
FIG. 5 is a block diagram showing the interfacing between the μPC and the video decompression apparatus of FIG. 4.

FIG. 5 illustrates an exemplary video processor 22 with a µPC interface to allow reading of data stored in the processor memory. All of the decompression memory is subsumed in a single memory 30 which is distinct from the buffer memory 15.

The video decompressor includes a FIFO 31, which has a data input bus coupled to the data output bus of the buffer memory 15 and a data request bus connected to the transport processor controller and a data output bus coupled to an internal memory/data bus. During video decompression operation the FIFO 31 requests data of the memory 15 as required for decompression. FIFO 31 accepts data as 8-bit bytes and applies 64-bit words to the memory/data bus. As these 64-bit words are created they are loaded into the external DRAM 30 at addresses provided by the address generator 33. Data is also read from the DRAM 30 under the control of the address generator 33 as required by the respective circuit apparatus within the decompression IC. In effect the address generator 33 is a state machine, responsive to stimuli provided by the respective decompression circuits, and programmed to write and read video data to and from memory according to a predetermined set of decompression stimuli vectors.

The decompression IC includes a start code detector 32 a variable length decoder, 34 and an element 35 which includes an inverse run length decoder IRLD, an inverse quantizer, IQUANT, an inverse discreet cosine transformer, IDCT, and a predictor, PREDICT. Data from the memory is shuttled to and from and between various ones of these functional elements, in a known manner, to decompress the compressed MPEG video data. The operations of the respective decompression functions is coordinated by a controller 38, which in large part is also a state machine. The controller 38 is responsive to stimuli produced by various of the decompression elements and data received from the memory/data bus via a memory I/O unit 36. Compressed video data is in 4:2:0 format, thus raw decompressed video data is provided in 4:2:0 format. This raw decompressed video data is applied to a display unit 37, which interpolates the raw video to provide a video output in 4:2:2 format. Decompression circuitry of this general form is currently available from different vendors and is not the object of this invention.

A control bus interconnects the controller 38 with all of the decompressor functional elements including the memory I/O unit 36. A µPC interface is also connected to the control bus, which provides a means of communication with a µPC external to the decompressor IC. It is anticipated that some level of interactivity will be incorporated into the transmission service, and at times this interactivity may not involve video. In these instances it may be desired to inhibit any operation of the decompressor IC, or condition it to provide a predetermined static display for example. These and other functions may be programmed into the controller and triggered by the µPC via the µPC interface.

To write special guide data to the DRAM 30 all that is required is that the decompression IC be instructed that the SCID associated with the special guide represents a video service. The decompression IC will accept the special guide data as if it were compressed video and write it to the DRAM. Normal decompression processing must be suspended to preclude decompression operations redistributing the stored special guide information within the DRAM. Decompression suspension is effected by the µPC when the special guide SCID is associated with the video decompressor.

Reading of special guide data from the DRAM 30 involves suspending normal operation of the controller 38 via the µPC interface 39, and accessing the DRAM 30 via the address generator 33 and the memory I/O 36. One of the normal functions of the controller 38 is to apply memory address start pointers to the memory address generator, to access specific compressed data in the DRAM, which compressed data establishes the parameters by which decompression should be performed. This same facility may be utilized for accessing the DRAM 30 to read special guide data. That is, the controller is arranged to accept address pointers from the μP C and apply same to the address generator. In this manner specific memory locations of the DRAM may be addressed by the μPC. Data read from the DRAM 30 is coupled to the control bus via the memory I/O, which converts 64-bit memory output words to e.g., 8-bit bytes. The respective 8-bit bytes are thereafter transferred via the μPC interface 39 to the μPC 17 wherein they may be used as menu program data or applied to the rate buffer memory 15 for subsequent use. During reading of the special guide data from DRAM, the normal operation of elements 32, 34, 35 and 36 may be suspended by the controller 38 responsive to μPC commands provided by the μPC interface 39.

The expanded capability of the overall system, that is, use of the dedicated video compressor memory for receiving and storing the special program guide, is effected with substantially no additional hardware. All that is required is a slight change in the programming of the controller 38 to accept read address pointers from the μPC interface, and an ability to suspend normal operations of ones of the decompression functions, changes that one skilled in the video decompression circuits art can readily make to his specific hardware/software embodiments.

The user interface 16 provides the user with a plurality of conventional options/controls such as volume control, channel selection, picture brightness control, etc. In addition, the user interface provides access to a menu of further system functions. For example, a user remote (not shown) may include a menu button which conditions the system to display (on a kinescope not shown) a menu of the further system options which may be selected via movement of a cursor and pressing an enter button in known manner. The menu includes the option of displaying the program guide. On selection of this option the μPC 17 is programmed to display a further menu which includes program guide options. These options may include: all program guides; only movies; only sports items; specials; etc., one of which may be selected by cursor movement and pressing an enter button.

Selection of a program guide option conditions the μPC 17 to request the CA_CSS byte or bytes stored by the smart card 14. The CA_CSS byte or bytes are loaded in a register within the μPC 17 for use in a comparison function. The μPC 17 executes the selected program guide function. In so doing, prior to a special guide being displayed, the PG_CSS byte associated with the selected special guide is compared with the CA_CSS byte or bytes stored in the register. If there is no match the guide will not be displayed and a message may be generated indicating to the user that that guide is not available to him. If there is a match, or if the PG_CSS byte corresponds to the universal access byte, the selected guide may be displayed conditioned upon the channel information included in the selected guide. Prior to displaying information relating to a particular channel in the selected guide, the CI_CSS byte or code associated with that channel is accessed and compared with the CA_CSS byte or bytes. If there is no match between the CA_CSS byte and the CI_CSS byte, the channel information is not displayed in the program guide. If there is a match, or if the CI_CSS byte corresponds to the universal access byte, the channel information will be displayed in the guide.

Similarly, if the selected program guide menu function corresponds to displaying master guide information, before information is displayed for any channel, the CI_CSS byte associated with the channel is tested against the CA_CSS byte or bytes accessed from the smart card, and the channel information is displayed or not displayed contingent upon the results of the test.

In generating any of the available program guide displays, μPC 17 is programmed to search predetermined data fields of the master guide data in the rate buffer memory 15, or the special guide data in the external DRAM 30 for types of program information desired. Each time program information of the desired type is found, the associated CI_CSS byte is accessed and compared against the user CA_CSS. If the comparison indicates that the user is entitled to view the program guide information, the information is placed in a table in memory (for example rate buffer memory 17) according to a predetermined format. After all relevant stored program guide data has been searched and associated CI_CSS's tested, and the allowed information placed in the table in memory, the data in the table is applied to the OSD apparatus 19. OSD 19 generates the appropriate pixel/raster information for displaying the program guide information as text within gridlines.

Figure 6:
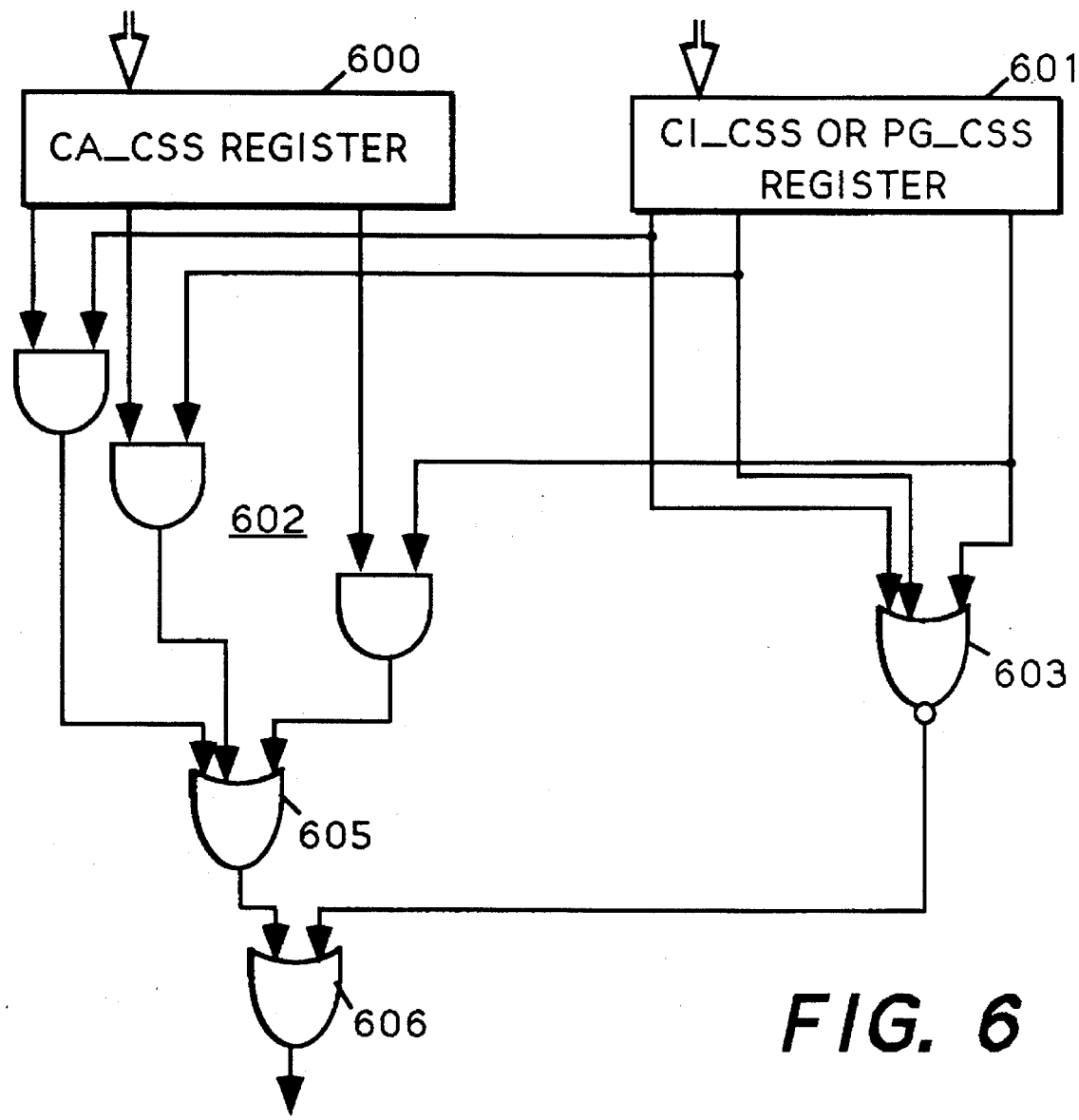
FIG. 6 is a schematic diagram of conditional access comparison circuitry.

An example of comparison function of the CA_CSS byte or bytes with either CI_CSS byte or PG_CSS byte is described as follows. Assume that a byte is N-bits and that special guides and channels/programs are grouped into N conditional access classes. One of the classes is an unconditional access class wherein all N-bits of the CI_CSS byte or PG_CSS byte are logic zero. Each of the remaining N-1 classes are allocated an exclusive bit of the N-bit byte. For example, assume the second, third, and fourth most significant bits (MSB) of the N-bit byte are assigned to the first, second and third conditional access classes. A logic one in the second MSB position (with all other bits zero) of a CI_CSS or PG_CSS byte indicates that the channel/program or special guide belongs to the first conditional access class. A logic one in the third MSB position of a CI_CSS or PG_CSS byte indicates that the channel/program or special guide belongs to the second CA class, etc. A user authorized to view a particular CA class will be issued a CA_CSS byte with logic ones in all of the bit positions corresponding to the CA classes he is authorized to view in the program guide. In this type of system comparison of the CA_CSS byte with either the CI_CSS or PG_CSS type, is performed on a bit by bit basis. If the comparison results in a match of any one bit position, the corresponding channel/program or special guide may be displayed. FIG. 6 illustrates exemplary circuitry to effect this type of comparison. The CA_CSS byte from the smart card circuitry is stored in the register 600 and the CI_CSS or PG_CSS currently being tested is loaded into register 601. A NOR gate 603 is coupled to the respective bit positions of the register 601 and produces a logic one output if all bit positions exhibit a logic zero (universal access). The output of NOR gate 603 is coupled to one input of an OR gate 606. OR gate 606 develops the display/no display control signal.

Each bit position of the byte in register 601 is compared with the corresponding bit position of the byte in register 602 in a plurality of AND gates 602. If corresponding bit positions are both logic one, the respective AND gate will exhibit a logic one output signal. Output connection of the respective AND gates are coupled to respective input connection of an OR gate 605. OR gate 605 produces a logic one output if any one of the AND gates 602 exhibits a logic one output. The output terminal of the OR gate 605 is connected to a second input terminal of OR gate 606. OR gate 606 will produce a logic one output, indicating access to display the program/channel or special guide associated with the conditional access byte currently being tested, if the byte has all zero bits or any one of the AND gates 602 exhibits a non zero output.

What is claimed is:

1. A method for conveying a plurality of audio/video programs, and a program guide signal including data related to scheduling times and descriptive information of the respective audio/video programs, comprising:

provoking a plurality of respective audio/video packet signals corresponding to said plurality of audio/video programs;

preparing scheduling data to produce programming information related to scheduling times and descriptive information of respective said audio/video programs;

creating a master program guide by selecting data from said programming information according to a predetermined criterion, and including conditional access codewords, associated with at least some of said programming information included in the master program guide, which conditional access codewords may be used by respective receivers for permitting or precluding display of corresponding programming information;

forming a master program guide packet signal from said master program guide; and forming a multiplexed signal for transmission or storage, by multiplexing said master program guide packet signal with said audio/video packet signals.

2. The method set forth in claim 1 further including the steps:

creating special program guides by selecting data from said programming information according to further respective predetermined criteria;

forming respective special program guide packet signals from said special program guides;

associating respective conditional access codewords with programming information related to at least one of respective said special program guides, which conditional access codewords may be used by respective receivers for permitting or precluding display of said at least one of respective said special program guides;

including programming information related to said special program guides in said master program guide; and multiplexing said master guide packet signal, said special guide packet signals and said audio/video packet signals.

3. The method set forth in claim 1 wherein the step of associating a conditional access codeword, with at least some of said programming information included in the master program guide includes associating a universal conditional access codeword with all programming information allocated for unconditional display in a program guide.

4. The method of claim 1 further including:

generating a user specific conditional access codeword;

forming a conditional access packet signal including said user specific conditional access codeword; and multiplexing said conditional access packet signal with said master guide packet signal and said audio/video packet signals.

5. The method set forth in claim 2 further comprising:

detecting said multiplexed signal and selecting said master program guide packet signal and said special program guide packet signals;

extracting master program guide information from said master program guide packet signal, and storing master program guide information in memory;

extracting special program guide information from said special program guide packet signal, and storing special program guide information in memory;

providing a user specific conditional access codeword;

processing master program guide information for the display of special program guide information, including comparing conditional access codewords associated with respective special program guides with said user specific conditional access codeword, and precluding the display of special guide information for which the corresponding conditional access codewords and the user specific conditional access codeword have predetermined dissimilarities.

6. The method set forth in claim 1 further comprising:

detecting said multiplexed signal and selecting said master program guide packet signal;

extracting master program guide information from said master program guide packet signal, and storing master program guide information in memory;

providing a user specific conditional access codeword;

processing master program guide information for the display of program guide information, including comparing conditional access codewords associated with respective audio/video programs with said user specific conditional access codeword, and precluding the display of program guide information of an audio/video program for which the corresponding conditional access codewords and the user specific conditional access codeword have predetermined dissimilarities.

7. Apparatus for receiving a packet audio/video signal including a master program guide packet signal having information related to programs available in said packet audio/video signal, said information related to programs including respective conditional access codes, said apparatus comprising:

means for detecting said packet audio/video signal;

memory means;

a transport processor for selecting said master program guide packet signal, and storing master program guide information in said memory means;

a source of a user specific conditional access code;

a display processor for displaying program guide information, said display processor including means for accessing said conditional access codes of respective program information and said user specific conditional access code and responsive to similarities/dissimilarities between said conditional access codes and user specific conditional access code displaying/not displaying the corresponding program guide information in a program guide display.

8. The apparatus set forth in claim 7 wherein said packet audio/video signal further includes a plurality of special program guide packet signals and said master program guide packet signal includes information related to special program guide packet signals including respective special program guide conditional access codes, and said display processor further comprises means responsive to similarities/dissimilarities between said conditional access codes and said user specific conditional access code, for displaying/not displaying the corresponding special program guide.

9. Apparatus for receiving a audio/video packet signal including a master program guide packet signal and a plurality of special program guide packet signals and wherein said master program guide packet signal includes information related to special program guide packet signals including respective special program guide conditional access codes, said apparatus comprising:

means for detecting said packet audio/video signal;

a memory;

a transport processor for selecting said master program guide packet signal, and said plurality of special program guide packet signals, and storing master program guide information contained in said master program guide packet signal, and special program guide information contained is special program guide packet signals in said memory;

a source of a user specific conditional access code;

a display processor for displaying program guide information, said display processor including means for accessing respective special program guide conditional access codes from master program guide information stored in said memory, and accessing said user specific conditional access code from said source, and responsive to similarities/dissimilarities between respective special program guide conditional access codes and said user specific conditional access code, displaying/ not displaying the corresponding special program guide information in a program guide display.

10. The apparatus set forth in claim 9 wherein said audio/video packet signal further includes a conditional access packet signal including information corresponding to said user specific conditional access codeword CA_CSS, and said apparatus further includes:

a smart card processor for providing said user specific conditional access codeword CA_CSS responsive to said information included in said conditional access packet signal; and said transport processor selects said conditional access packet signal from said audio/video packet signal and provides conditional access information contained in said conditional access packet signal to said smart card processor.

11. A method of processing an audio/video packet signal including a master program guide packet signal and a plurality of special program guide packet signals and said master program guide packet signal includes information related to special program guide packet signals including respective special program guide conditional access codes, said method comprising the following steps:

detecting said packet audio/video signal and selecting said master program guide packet signal and said special program guide packet signals;

extracting master program guide information from said master program guide packet signal, and storing master program guide information in memory;

extracting special program guide information from said special program guide packet signal, and storing special program guide information in memory;

providing a user specific conditional access codeword;

processing master program guide information for the display of special program guide information, including comparing conditional access codewords associated with respective special program guides with said user specific conditional access codeword, and precluding the display of special guide information for which the corresponding conditional access codewords and the user specific conditional access codeword have predetermined dissimilarities.

* * * * *